(No Model.)
H. F. CAMPBELL.
METALLIC CIRCUIT.
No. 413,707.          Patented Oct. 29, 1889.
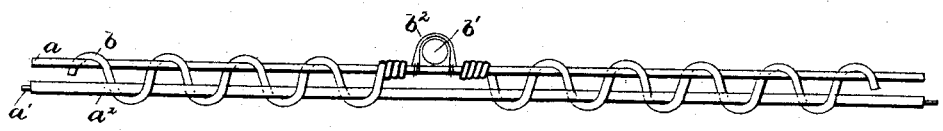
Witnesses
Fred R. Cornwall,
John C. Edwards.
Inventor:
Henry F. Campbell,
by Crosby & Gregory,
Atty's

UNITED STATES PATENT OFFICE.

HENRY F. CAMPBELL, OF MALDEN, MASSACHUSETTS.

METALLIC CIRCUIT.

SPECIFICATION forming part of Letters Patent No. 413,707, dated October 29, 1889.

Application filed April 9, 1889. Serial No. 306,581. (No model.)

*To all whom it may concern:*

Be it known that I, HENRY F. CAMPBELL, of Malden, county of Middlesex, State of Massachusetts, have invented an Improvement in Metallic Circuits, of which the following description, in connection with the accompanying drawing, is a specification, like letters on the drawing representing like parts.

This invention relates to a novel metallic circuit especially adapted to be used in telephonic communication, and is an improvement upon the metallic circuit shown and described in another application, Serial No. 291,791, filed by me November 24, 1888, my present invention having for its object to simplify the construction of the same.

My invention therefore consists, essentially, in the combination, with a metallic circuit composed of two branches or wires, of a separator of textile material wound about the said branches throughout the length of the circuit to separate and yet bind the said branches, substantially as will be described.

Other features of my invention will be pointed out in the claims at the end of this specification.

The drawing shows a sufficient portion of a metallic circuit embodying my invention to enable it to be understood, one conductor of the circuit being connected to an insulator.

The circuit is composed of two branches $a$ $a'$, one branch, as $a'$, consisting, preferably, of a copper wire of small cross-section covered by insulation $a^2$ of any usual material, the branch $a$ being, preferably, a bare wire of large cross-section—such, for instance, as an iron wire, substantially as in the application referred to.

The branches $a$ $a'$ of the metallic circuit are joined together and separated from one another throughout their length by a combined separator and binder $b$, which in the present instance is a water-proof cord or tape or other textile material, the said cord as it is wound upon the wires being passed between them. The bare wire $a$, or it may be an indifferently-insulated wire, as described in the application referred to, is joined to the insulator by an auxiliary wire $b^2$, the cord or tape $b$ being separated on each side of the insulator and securely fastened, as herein shown, to the branch $a$. The flexible separator $b$, being of textile material, enables the branches to be joined substantially close together and yet not be brought in contact electrically, and on long lines the water-proof cord, on account of its cheapness, is an important factor. Besides, it greatly heightens the insulative resistance between the branches of the circuit, as it—the insulated cord or space—separates the insulated wires from end to end and prevents short-circuiting by capillary attraction.

By securing the bare or indifferently-insulated wire to the insulator, leaving the insulated wire $a'$ unconnected therefrom, all danger of cutting through or abrasion of the insulation on the wire or wires is obviated and also the danger of compressing the two branches into a metal or electrical connection and short-circuiting is avoided.

An additional caution may be the use of insulated wires for tying to insulators. The cord or textile binder and separator being non-metallic, diminishes the danger of short-circuiting to a minimum or renders such evil almost impossible.

The separator $b$ may be made of any non-metallic material—such as asbestos fiber—and the said separator and binder may be used to unite uninsulated wires of equal or different cross-section.

In the drawing the wires $a$ $a'$ are shown separated to a greater extent than they would be in practice, in order that my invention may be more readily comprehended. In practice the wires $a$ $a'$ will be brought close together; but they will be prevented from touching each other by the separator $b$, which is interposed between them.

I claim—

1. The combination, with a metallic circuit composed of two branches or wires $a$ $a'$, of a separator $b$, of textile material, wound about and between the said branches throughout the length of the circuit to separate and yet bind the said branches, the said separator obviating short-circuiting of the metallic circuit, substantially as described.

2. The combination, with a metallic circuit composed of two branches or wires $a$ $a'$, the branch $a'$ being an insulated conductor and the branch $a$ a bare wire or indifferently-insulated conductor, of a separator $b$, of textile material, wound about and between the said branches throughout the length of the circuit to separate and yet bind the said branches, substantially as described.

3. The combination, with a metallic circuit consisting of branches composed of independent wires, of a separator $b$, of textile material, wound about the said branches to bind and yet separate the same, an insulator, and a wire $b^2$, wound about said insulator and one wire of the circuit only, substantially as described.

In testimony whereof I have signed my name to this specification in the presence of two subscribing witnesses.

HENRY F. CAMPBELL.

Witnesses:
 JAS. H. CHURCHILL,
 B. DEWAR.